US008958186B2

(12) United States Patent
Lefferts et al.

(10) Patent No.: US 8,958,186 B2
(45) Date of Patent: Feb. 17, 2015

(54) MITIGATING CROSS-DOMAIN TRANSMISSION OF ELECTROSTATIC DISCHARGE (ESD) EVENTS

(71) Applicant: Synopsys, Inc., Mountain View, CA (US)

(72) Inventors: Robert B. Lefferts, Portland, OR (US); Peter C. de Jong, Oosterbeek (NL); Roland G. de Jonge, Eindhoven (NL)

(73) Assignee: Synopsys, Inc., Mountain View, CA (US)

( * ) Notice: Subject to any disclaimer, the term of this patent is extended or adjusted under 35 U.S.C. 154(b) by 109 days.

(21) Appl. No.: 13/633,815

(22) Filed: Oct. 2, 2012

(65) Prior Publication Data
US 2014/0092507 A1  Apr. 3, 2014

(51) Int. Cl.
*H02H 9/04* (2006.01)

(52) U.S. Cl.
USPC .......................................................... 361/56

(58) Field of Classification Search
CPC ... H02H 9/04; H01L 27/0251; H01L 27/0292
USPC .......................................................... 361/56
See application file for complete search history.

(56) References Cited

U.S. PATENT DOCUMENTS

| | | | |
|---|---|---|---|
| 6,011,681 A | 1/2000 | Ker et al. | |
| 6,075,686 A | 6/2000 | Ker | |
| 6,144,542 A | 11/2000 | Ker et al. | |
| 7,110,228 B2 | 9/2006 | Chang | |
| 7,233,467 B2 | 6/2007 | Mergens et al. | |
| 7,352,547 B2 | 4/2008 | Okushima | |
| 7,692,907 B2 | 4/2010 | Chen et al. | |
| 7,768,350 B2 | 8/2010 | Srinivasan et al. | |
| 7,869,174 B2 * | 1/2011 | Tanaka et al. | 361/56 |
| 2001/0045571 A1 * | 11/2001 | Gandhi et al. | 257/202 |
| 2009/0097174 A1 | 4/2009 | Ker et al. | |
| 2009/0135534 A1 * | 5/2009 | Ishii | 361/56 |
| 2011/0063763 A1 | 3/2011 | Alvarez et al. | |
| 2012/0154962 A1 | 6/2012 | Russ et al. | |

OTHER PUBLICATIONS

Archive of Chen, et al., "A CMOS Standard-Cell Library for the PC-Based LASI Layout System," The University of Idaho Center in Boise, Sep. 25, 2010, 4 pages, [Online] [Archived by http://archive.org on Sep. 25, 2010; Retrieved on Sep. 29, 2013] Retrieved from the Internet<URL:http://web.archive.org/web/20100925153656/http://cmosedu.com/jbaker/papers/1998/MW981.pdf>.
PCT International Search Report and Written Opinion, PCT Application No. PCT/US2013/041580, Oct. 10, 2013, 15 pages.

* cited by examiner

*Primary Examiner* — Scott Bauer
(74) *Attorney, Agent, or Firm* — Fenwick & West LLP

(57) ABSTRACT

An electrostatic discharge (ESD) device is implemented within a power domain to mitigate imparting ESD induced voltages on other power domains for reducing integrated circuit (IC) failures. A first power domain includes an interface with a first terminal where an ESD event is received. The interface includes a second terminal coupled to a component within a second power domain. The ESD device is disposed between the first terminal and second terminal to intercept the ESD event. In one embodiment, the ESD device includes a blocking device. The blocking device operatively decouples the first terminal and second terminal in response to a trigger signal received during an ESD event. By operatively decoupling the terminals, transmission of the ESD induced voltages is substantially mitigated. Embodiments of the ESD device can be implemented using standard cell libraries to simplify integration.

11 Claims, 8 Drawing Sheets

MITIGATING CROSS-DOMAIN TRANSMISSION OF ELECTROSTATIC DISCHARGE (ESD) EVENTS

CROSS REFERENCE TO RELATED APPLICATION

This application is related to U.S. patent application Ser. No. 13/477,971, entitled "Preventing Electrostatic Discharge (ESD) Failures Across Voltage Domains," filed May 22, 2012, which is incorporated by reference herein in its entirety.

BACKGROUND

1. Field of the Disclosure

The present disclosure relates to a circuit for mitigating electrostatic discharge and more specifically to mitigating the transmission of electrostatic discharges to prevent device failures.

2. Description of the Related Art

Electrostatic discharge (ESD) events are serious issues concerning the longevity and durability of integrated circuits (ICs). ESD events are caused by the familiar buildup and discharge of charges due static electricity and also through electrostatic induction, which occurs when a conductive object is exposed to an electric field. The electric field causes the distribution of charges on the conductive object to become uneven, thereby concentrating like charges which are subsequently discharged to cause an ESD event.

ICs include semiconductor materials such as silicon and insulating materials such as silicon dioxide that are patterned or deposited in specific ways to enable a given function. If either of these materials suffers damage, such as due to an ESD event, the IC may become inoperable or suffer significant loss in performance. Accordingly, ESD prevention devices are typically implemented within the IC's power/ground domain (herein "power domain") for handing such ESD events.

Further, with the advancement of IC designs, many System-on-chips (SoCs) and other IC implementations oftentimes involve multiple subsystems and interfaces that operate in separate power domains. For example, a power domain with a 3.3V rail may service a processing core while another power domain with a 5V rail may service a Universal Serial Bus (USB) interface. In order to receive data from the interface, the processing core and interface are coupled, thereby creating a power domain boundary. Although existing ESD devices can mitigate ESD events within separate, single power domains, some ESD events are imparted from one power domain into another and subsequently cause IC failures at power domain boundaries.

SUMMARY

Embodiments relate to an Electrostatic discharge (ESD) device in a first power domain for mitigating ESD events imparted onto another power domain to reduce integrated circuit failures. The ESD device may include standard cell components in the first power domain configured to mitigate ESD events imparted on components in other power domains. A first standard cell component is coupled to a first voltage rail in the first power domain. The first standard cell component includes an output terminal, a blocking device and a transistor. The output terminal is coupled to a component within the second power domain which may have a second voltage rail to power the component. The blocking device is configured to operatively decoupled the first voltage rail from the output terminal according to a trigger signal. The transistor is coupled to the first voltage rail and configured to turn on or off current to the blocking device according to a data signal. A second standard cell component is coupled to the first voltage rail of the first power domain. The second standard cell component is configured to change the trigger signal in response to a change in voltage on the first voltage rail, such as during an ESD event received at the first voltage rail. Thus, in response to the trigger signal, the first standard cell operatively decouples the first voltage rail from the output of the interface at the power domain boundary to mitigate transmission of an ESD event to another power domain.

Embodiments of the ESD device may include a serial coupling of the blocking device and the transistor. The transistor may receive data for transmission on the output terminal by operatively coupling the first voltage rail to the blocking device. The blocking device, in turn, may prevent transmission of data during ESD events.

Embodiments of the ESD device may be implemented in complimentary metal-oxide-semiconductor logic. In one embodiment, the transistor of the first standard cell component is a first p-type metal-oxide-semiconductor field-effect transistor (pMOS) and the blocking device of the first standard cell component is a second pMOS transistor. The first pMOS transistor may include a source terminal coupled to the first voltage rail, a gate terminal coupled to receive data signals, and a drain terminal coupled to a source terminal of the second pMOS transistor. The second pMOS transistor may include a source terminal coupled to the first transistor, a gate terminal coupled to receive the trigger signal, and a drain terminal coupled to the output terminal.

BRIEF DESCRIPTION OF THE DRAWINGS

The teachings of the embodiments can be readily understood by considering the following detailed description in conjunction with the accompanying drawings.

DETAILED DESCRIPTION

Figure 1:
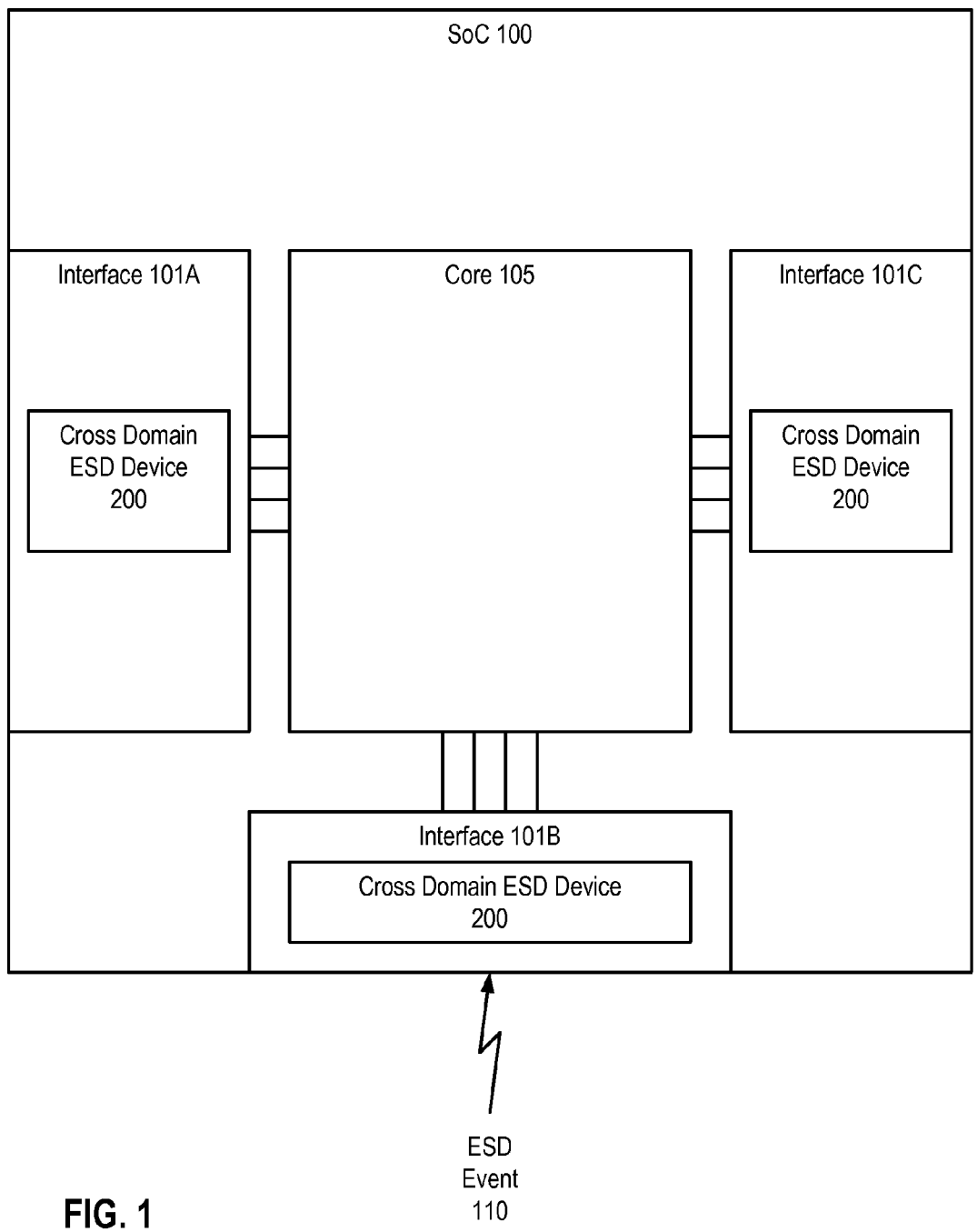
FIG. 1 is a block diagram illustrating a system-on-chip according to one embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Embodiments relate to an electrostatic discharge device (ESD) device using standard cell components and placed within a first power domain to mitigate the transmission of electrostatic discharges to a second power domain including components that may fail when a voltage spikes in the second power domain due to the transmitted electrostatic discharge. To mitigate the transmission of the ESD events, a blocking device of the ESD device may be coupled between the voltage rail of the first power domain and an output terminal of first the power domain interfacing with the second power domain. When an ESD event occurs, the voltage rail of the first power domain can carry ESD inducted voltages exceeding safe operating levels. The ESD device detects ESD induced voltage changes on the voltage rail and generates a trigger signal that causes a blocking device within the ESD device to operatively decouple (e.g., prevent flow of current between) the voltage rail and the output terminal of the ESD device. By leveraging existing standard cells to construct the ESD device, the ESD device can be conveniently designed using electronic design automation (EDA) tools.

As referred to herein, a standard cell component refers to one or more circuit components and their interconnect structures that can be designed using a standard cell library. Example standard cell components may provide a logic function (e.g., AND, NAND, OR, XOR, NOT, etc.) or storage function (e.g., flipflop or latch).

If a potential difference between the input terminal and the source or drain increases significantly due to ESD events, a transistor may suffer permanent damage or complete failure. An ESD device may reduce the potential difference to prevent IC failures. Although implementing a cross domain ESD device at every input within a power domain (e.g., receives output from another power domain) may protect an entire System on Chip (SoC), such implementations are not always feasible or desirable. Also, from a development standpoint, an IC designer may use a variety of components from a variety of manufacturers that can include varying degrees of ESD protection. Therefore, for any given power domain on the SoC, mitigation of ESD events received from other power domains and/or mitigation of the transmission of ESD events to other power domains may be desirable.

FIG. 1 is a block diagram illustrating a system-on-chip (SoC) 100 according to one embodiment. As shown, the SoC 100 includes a processing core 105 and several interfaces 101A through 101C (hereinafter collectively referred to as "the interfaces 101") coupled to the core 105. In other embodiments, the SoC 100 may include additional components in addition to the core 105 and interfaces 101 such as a memory or system controller (not shown).

The processing core 105 receives signals from the interfaces 101 or other components not illustrated in FIG. 1. Each of the interfaces 101 may represent a universal serial bus (USB), firewire, Peripheral Component Interconnect (PCI), Small Computer System Interface (SCSI) or other suitable input/output (I/O) interface for exchanging signals with the core 105. The data exchanged between an interface 101 and the core 105 may be bi-directional or uni-directional (e.g., the interface does not receive data).

FIG. 1 also illustrates an ESD event 110 at interface 101B. One common example resulting in ESD event 110 includes a person or peripheral discharging a buildup of charge into the interface. In another example, ESD event 110 may result from the interface discharging charge into a person or peripheral. In such instances, ESD event 110 may cause serious damage to SoC 100 components such as core 105 which is coupled to the interface 101B.

In order to prevent damage to SoC 100 components in other power domains (e.g., processing core 105) from the cross domain ESD event 110, one or more cross domain ESD devices 200 may be implemented on the SoC 100.

FIG. 1 illustrates one example placement of a cross domain ESD device (ESD device) 200 within interface 101B for preventing transmission of the ESD event 110 to the processing core 105. In other embodiments, the ESD device 200 may be partially or entirely (e.g., as a standalone block) implemented between an interface 101 and the core 105.

Figure 2A:
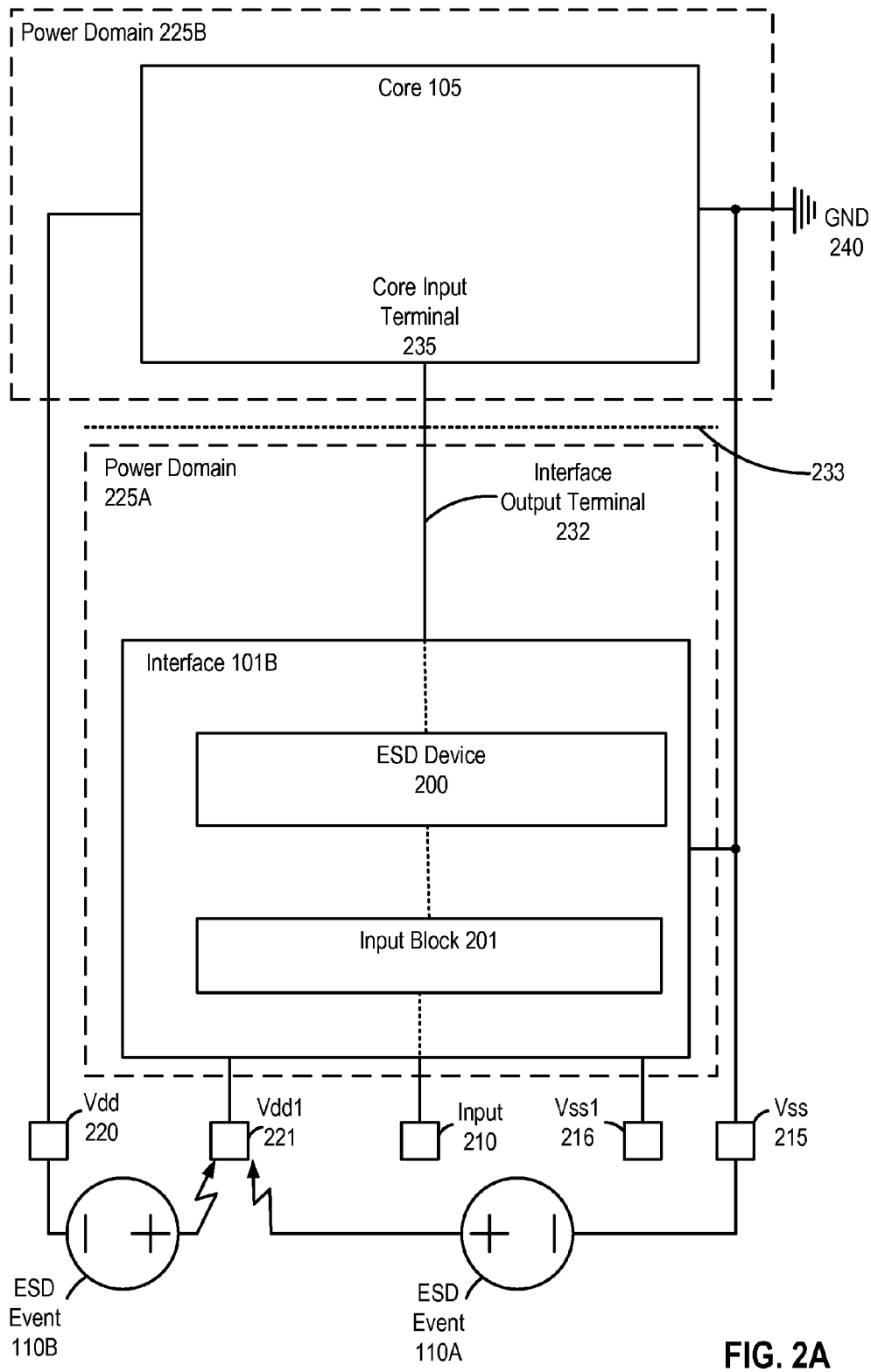
FIG. 2A is a block diagram illustrating an example of an ESD device for mitigating the transmission of ESD events across power domain boundaries, according to one embodiment.

FIG. 2A is a block diagram illustrating an example of an ESD device 200 for mitigating the transmission of ESD events 110 across power domain boundaries, according to one embodiment. As shown, an example power domain boundary 233 separates an interface 101B (within power domain 225A) and the core 105 (within power domain 225B).

Power domain 225A may include, among other components, an interface 101B coupled to interface supply lines Vdd1 221 and Vss1 216 (positive and negative/ground supply, respectively). Vdd1 221 and Vss1 216 power the interface 101B circuitry and/or connected peripherals.

Power domain 225B may include, among other components, a core 105 coupled to the main supply lines Vdd 220 and Vss 215 (i.e., positive and negative/ground supply, respectively). Vdd 220 and Vss 215 power the core 105 and other components within power domain 225B.

In some embodiments, the negative supply/ground line Vss 215 is shared with multiple SoC 100 components. In the illustrated embodiment, for example, components 105, 101B in different power domains 225 are coupled to a common ground 240 through Vss 215.

FIG. 2A also shows two example ESD events 110A and 110B which respectively illustrate a potential difference measured at Vdd1 221 with respect to Vss 215 and a potential difference measured at Vdd1 221 with respect to Vdd 220. Other embodiments consider ESD events 110 at other terminals and measurements with respect to other terminals or sources. For example, an ESD event 110 may result from discharging a capacitor into Vdd1 221 and the potential measured at Vdd1 221 with respect to Vdd 220 or Vss 215. Discussion of each permutation is duplicative and omitted for clarity.

The interface 101B includes an interface input terminal 210 and interface output terminal 232. The interface 101B receives signals via the interface input terminal 210 and outputs corresponding signals for processing, e.g., at the core 105, via the interface output 232. The core 105, in turn, includes an input terminal 235 coupled to the interface output 232 for receiving signals from the interface 101B.

The interface 101B itself may include multiple components including an input block 201 and an ESD device 200. The input block 201 receives signals on the interface input 210 and may perform one or more operations on the signals. The input block 201 transmits a corresponding signal to the ESD device 200.

The ESD device 200, in turn, receives signals from the input block 201 and operatively transmits a corresponding signal on the interface output terminal 232. For example, during non-ESD conditions the ESD device 200 may transmit signals to the core 105 on the interface output 232. In contrast, during ESD events 110, the ESD device 200 may block transmissions on the interface output 232 to protect the core 105. Additionally, in some embodiments, the ESD device 200 may perform one or more operations on the signal prior to transmission.

The ESD device 200 also receives ESD induced voltages corresponding to ESD events received at the interface 101B. The illustrated embodiment, example ESD events 110A and 110B are received at Vdd1 221 and are conducted within interface 101B. The ESD events 110 may cause a voltage change at the interface output terminal 232, which is coupled to an input terminal of an IC (e.g., 235 of the core 105) within power domain 225B. Traditionally, the interface 101B could transmit these elevated voltages on the interface output terminal 232 and cause damage to the core 105.

The ESD device 200 intercepts these ESD induced voltage changes and mitigates their transmission through an operative decoupling of the interface output terminal 232 and the terminal experiencing ESD induced voltage levels. Once the voltages on the affected terminal return to non-ESD induced levels, the ESD device 200 may again couple the terminal and the output terminal 232 and transmit signals to the core 105. In this way, the ESD device 205 prevents IC failures on the SoC 100.

In addition to intercepting the voltage change due to the ESD event 110 to protect the core 105, the ESD device 200 itself may mitigate the effects of the ESD event 110 to prevent damage to the interface 101B that would otherwise disrupt passage of signals during normal operation.

Figure 2B:
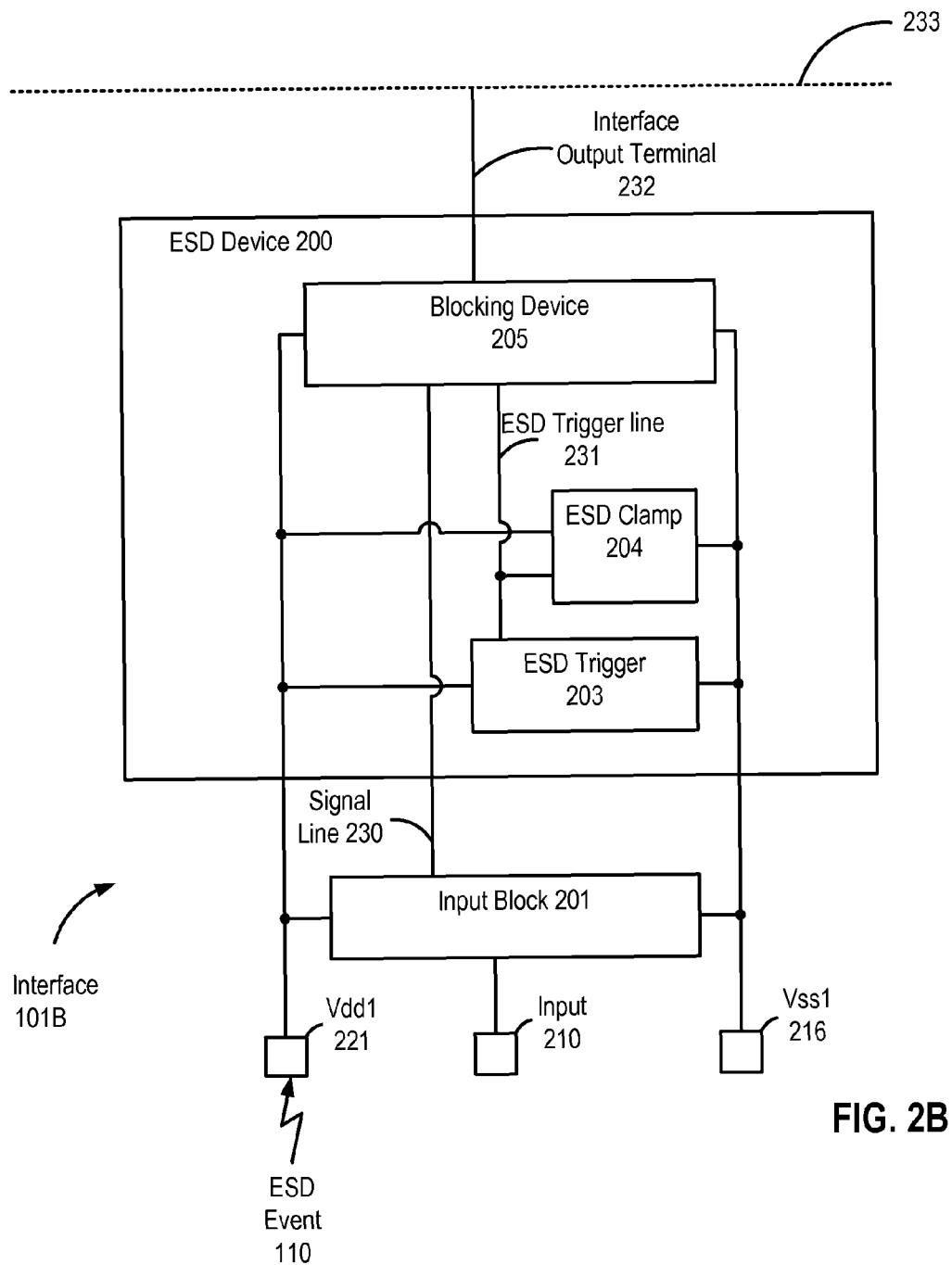
FIG. 2B is a block diagram illustrating example components of an ESD device for mitigating the transmission of an ESD event across a power domain boundary, according to one embodiment.

FIG. 2B is a block diagram illustrating example components of an ESD device 200 for mitigating the transmission of ESD events 110 across a power domain boundary 233, according to one embodiment. As shown, the ESD device 200 may include a blocking device 205, an ESD trigger 203 and an ESD clamp 204. All of these components are coupled to voltage rails Vdd1 221 and Vss1 216. The ESD clamp 204, the ESD trigger 203, and the blocking device 205 are coupled to an ESD trigger line 231. The blocking device 205 is further coupled to interface output terminal 232 and signal line 230.

During normal operation, the blocking device 205 receives data on the signal line 230 from the input block 201 and, in turn, transmits corresponding data on the interface output terminal 232. The blocking device 205 may transmit the corresponding data by driving the interface output 232 to the voltage on Vdd1 221. During an ESD event 110, sudden increase in the voltage on Vdd1 221 across the power domain boundary 223 may damage components within the other power domain.

In order to mitigate transmission of ESD induced voltages, the blocking device 205 is configured to operatively decouple the interface output terminal 232 and Vdd1 221; thusly preventing the application of ESD induced voltages on Vdd1 221 to components within the other power domain. In one embodiment, the blocking device 205 decouples Vdd1 221 and the output terminal 232 in response to a trigger signal received on the trigger line 231.

The ESD trigger 203 detects ESD events 110 on the voltage rails and generates corresponding trigger signals. In one embodiment, the ESD trigger 203 generates a trigger signal if a change in voltage on Vdd1 221 exceeds a threshold value.

In some embodiments ESD device 200 includes ESD clamp 204 to protect components within the power domain (e.g., 225A) of the interface 101B. For example, in response to the trigger signal, the ESD clamp 204 may couple Vdd1 221 and Vss1 216 to substantially conduct an ESD current to ground, causing the voltage on Vdd1 221 to subside within normal operating levels.

Figure 3:
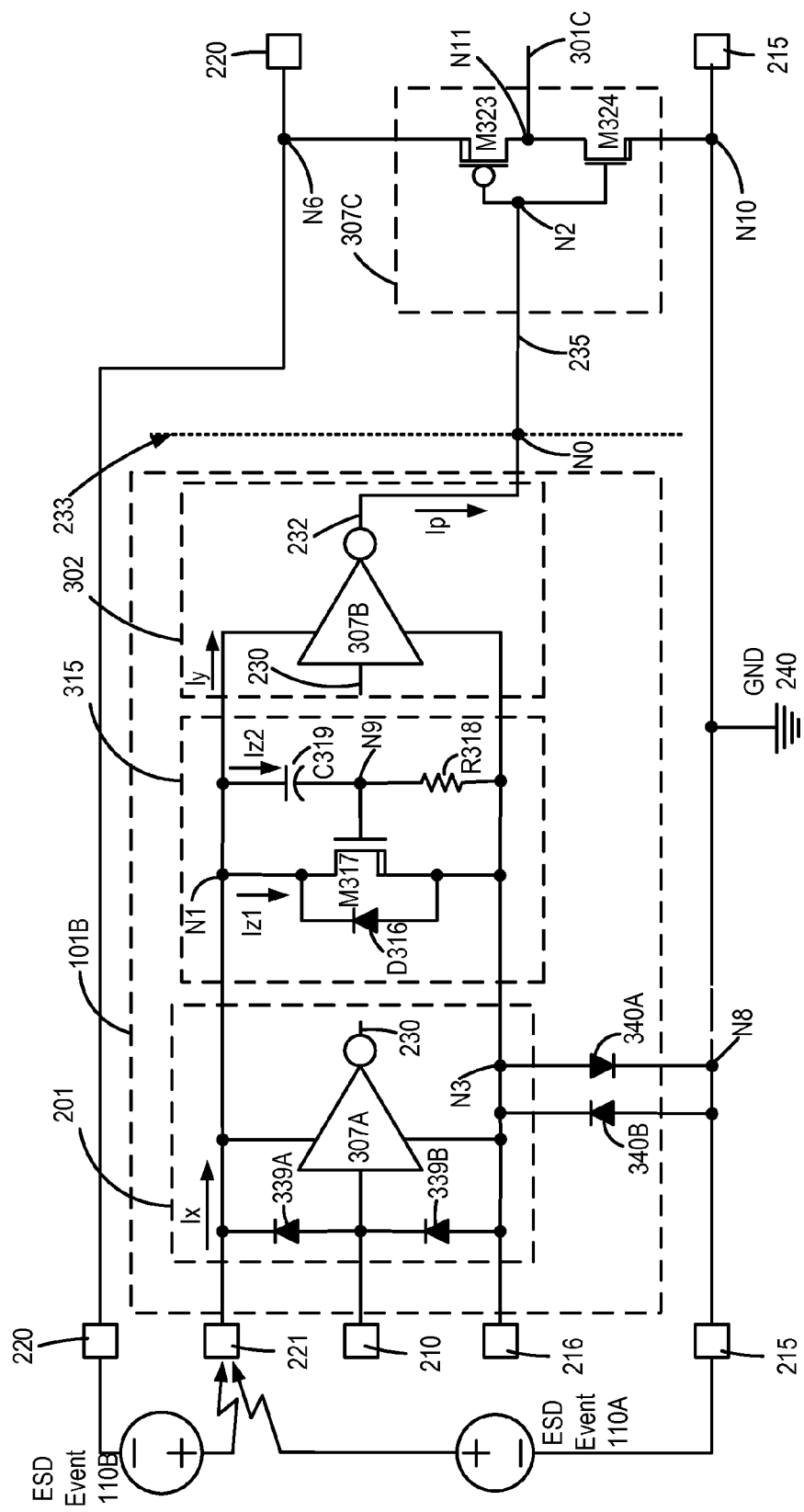
FIG. 3 is a circuit diagram illustrating transmission of an example ESD event across a power domain boundary according to one embodiment.

FIG. 3 is a circuit diagram illustrating transmission of an example ESD event 110 across a power domain boundary 233, according to one embodiment. FIG. 3 shows an example embodiment of the interface 101B on a SoC 100 and corresponding input circuitry 307C of a SoC component (e.g., core 105) without cross domain ESD protection. The interface 101B includes an output terminal 232 coupled to the core input terminal 235 of the input circuitry 307C at node N0, which represents the power domain boundary 233.

The interface 101B may include, among other components, an input block 201, output block 302 and ESD protection components for the power domain (e.g., 225A) of the interface. The input block 201 and output block 302 may include one or more signaling components such as inverters 307A and 307B, respectively. ESD protection components may include input diodes 339A and 339B, anti-parallel diodes 340A and 340B and local ESD structure 315. One embodiment of the local ESD structure 315 includes a transistor M317, blocking diode D316, capacitor C319 and resistor R318. The ESD components protect the interface signal components 307A and 307B from ESD events 110 within its power domain 225A. However, these ESD components 339, 340, 315 do not prevent inverter 307B from causing a change in voltage due to the ESD events 110 at node N0, which in turn affects circuitry within power domain 225B.

In one embodiment, the input circuit 307C of the SoC 100 component is an inverter that includes transistors M323 and M324. When implemented in CMOS, transistors M323 and M324 are respectively implemented as an "active low" p-type metal-oxide-semiconductor field-effect transistor (pMOS) and an "active high" n-type metal-oxide-semiconductor field-effect transistor (nMOS). In CMOS, active low transistors are "ON" (i.e., in a conducting state) when their gate terminals are logic 0 or "low" (e.g., ground). Active high transistors are "ON" when their gate terminals are logic 1 or "high" (e.g., supply Vdd or Vdd1).

The gate terminals of M323 and M324 are coupled at node N2 which forms the input terminal 235 of the SoC 100 component. The drain terminals of M323 and M324 are coupled to form signal line 301C which passes inverted versions of signals received at the input terminal 235 to the SoC 100 component. The sources of M323 and M324 are respectively coupled to power (Vdd 220) and ground (Vss 215) lines. Thus, when the transistors M323, M324 are in their "ON" states, they substantially conduct and effectively couple signal line 301C to either Vdd 220 or Vss 215. Selectively coupling the signal line 301C to Vdd 220 and Vss 215 respectively generates high "Vdd" and low "Vss" input signals for the SoC 100 component.

Inverters 307A and 307B may include components configured similar to those (e.g., M323 and M324) of input circuitry 307C. The inverters 307 are coupled to power (Vdd1 221) and ground (Vss1 216) to generate high "Vdd1" and low "Vss1" signals at their outputs.

Inverter 307A receives input signals (e.g., X) from the interface 101 input terminal 210 and passes inverted versions (e.g., $\overline{X}$) of the input signal along output 301A, which, in one embodiment, can be coupled to the input 301B of inverter 307B. In other embodiments, other logic may exist in between the output 301A and the input 301B of the inverter 307B. In such cases, signals received at the input may be a derivative of $\overline{X}$ or a function of multiple input signals. Assuming, for example, that output 301A is coupled directly to input 301B, the inverter 307B, in turn, inverts the signal, $\overline{X}$, and passes signal X' (X prime) to the interface output 232. In one embodiment, signal X' is electrically isolated from signal X, but carries the same data during normal operation. Due to their electrical isolation, the voltage level between X' and X may differ due to ESD events 110 and other power source fluctuations. For example, because the inverter 307B selectively couples the interface output 232 to Vdd1 221 and Vss1 216 to generate the high and low values of X', the voltage at the interface output 232 fluctuates between the voltages of Vdd1 for "high" signals and Vss1 for "low" signals whereas the voltage at the input terminal 210 may be driven by other voltage sources.

Consider, for example, inverter 307A in a state where line 301A is coupled to Vss1 216 and thus, drives the signal on 301A "low" to the voltage of Vss1. Inverter 307B receives the voltage of Vss1 at its input 301B and, in turn, drives the interface output 232 "high" to the voltage of Vdd1 by coupling the output terminal 232 to Vdd1 221. As the output terminal 232 is coupled to node N0, inverter 307B also drives node N0 "high" to the voltage of Vdd1 221 at the power domain boundary 233. During typical operation, the Vdd1 221 voltage remains within the voltage levels tolerated by the input circuitry 307C. In the case of an ESD event 110 at Vdd1 221, the inverter 307B drives the voltage at node N0 towards the voltage of Vdd1 (e.g., the ESD voltage). The change in voltage at node N0 causes a change in voltage at the input terminal 235 of the input circuitry 307C. In turn, node N2 rises to the voltage of the input terminal 235. A voltage over a certain level at node N2 will degrade the transistors M323, M324, as explained in further detail below with reference to FIG. 3 during an ESD event 110.

The ESD event 110 at Vdd1 221 induces an ESD voltage along Vdd1 and causes an ESD current Ix from Vdd1 221. Input diode 339A prevents current Ix from flowing to the input terminal 210. As explained previously, the output 301A of inverter 307A is coupled to Vss1 (driven low) when the signal, X, on input 210 is high. Accordingly, Vdd1 221 substantially conducts current Ix to node N1. At node N1, the local ESD structure 315 substantially conducts current Ix from Vdd1 221 to Vss1 216.

Current Iz1 is conducted via transistor M317 when node N9 is high and current Iz2 induced in the local EST structure 315 while capacitor C319 is being charged. If the voltage at node N1 rises, so does the voltage across the capacitor C319. The current Iz2 results from the well known equation $I(t) = C*dV(t)/dt$ where the current, I, at time t is equal to the capacitance, C, of C319 times the derivative of voltage, V, across the capacitor (i.e., potential difference from node N1 and node N9) with respect to time. During charging of the capacitor C319, current Iz2 through resistor R318 causes the voltage at node N9 to increase. Resistor R318, in conjunction with capacitor C319, forms an RC voltage divider with an output at node N9. The capacitance value of capacitor C319 and the resistance of resistor R318 are selected according to the desired timing characteristics (e.g., according to well known RC analysis) and voltages used at the interface 101, which are well known in the art.

As shown in FIG. 3, the local ESD structure 315 includes an active high nMOS transistor M317 with its gate coupled to node N9. Thus, the voltage rise at N9 during the ESD event 110 causes transistor M317 to begin conducting current Iz1 to node N3 and then to ground 240 via Anti-Parallel diode 340A and node N8. In this way, the local ESD structure 315 protects the interface 101B by keeping the voltage potential between Vdd1 221 and Vss1 216 at a tolerable level (e.g., the voltage drop across M317 when conducting in the ON state) during the ESD event 110.

However, the voltage on Vdd1 221 may remain high (e.g., at or near the ESD voltage or a voltage level sufficient to cause oxide damage) relative to Vss 215 and/or ground 240 and thusly affect components (e.g., 307C) in other power domains 225B that receive voltages from Vdd1 221 at an input terminal 235 or otherwise. Specifically, when the voltage at node N9 rises above the threshold voltage required for transistor M317 to transition from its OFF state to the ON state, local ESD structure 315 conducts current Iz1 and Iz2 caused by the ESD event 110. With transistor M317 conducting current Iz1 from the ESD event 110 in the ON state, resistance between the drain and source of transistor M317 causes a voltage drop from Vdd1 221 to Vss1 216. In turn, forward voltage drops also occur across diode 340A from the ground rail Vss1 216 to Vss 215 and across conducting portions of the Vss1, Vss rails due to the rails' electrical resistance. With smaller processes, the voltage drop across conducting portions of the Vss rails, 215, 216 may increase due to smaller cross-sectional areas.

The combination of these forward voltage build-ups during ESD events 110 result in high, ESD induced, Vdd 221 voltages relative to Vss 215, which may be measured as the sum of the forward voltage drops across transistor M317, diode 340A and the portions of the Vss1 216, Vss 215 rails conducting current (e.g., Iz1 and Iz2) to ground 240.

If the inverter 307B couples the interface output 232 to Vdd1 221 while the voltage on Vdd1 remains high, the input circuitry 307C of the SoC 100 is subjected to the high voltage caused by the ESD event 110. The change in voltage at node N2 can result in the increase of potential measured from the gate-drain or gate-source of the transistors M323, M324 (e.g., from node N2 to node N6, N10 and/or N11).

If the potential difference is greater than a limit, a gate breakdown current Ip from the interface output 232 flows into transistors M323 and/or M324 which degrades, if not destroys, their gate oxides. Inverter 307B provides the gate breakdown current Ip via the output terminal 232 by conducting a portion Iy of the ESD current Ix.

Figure 4A:
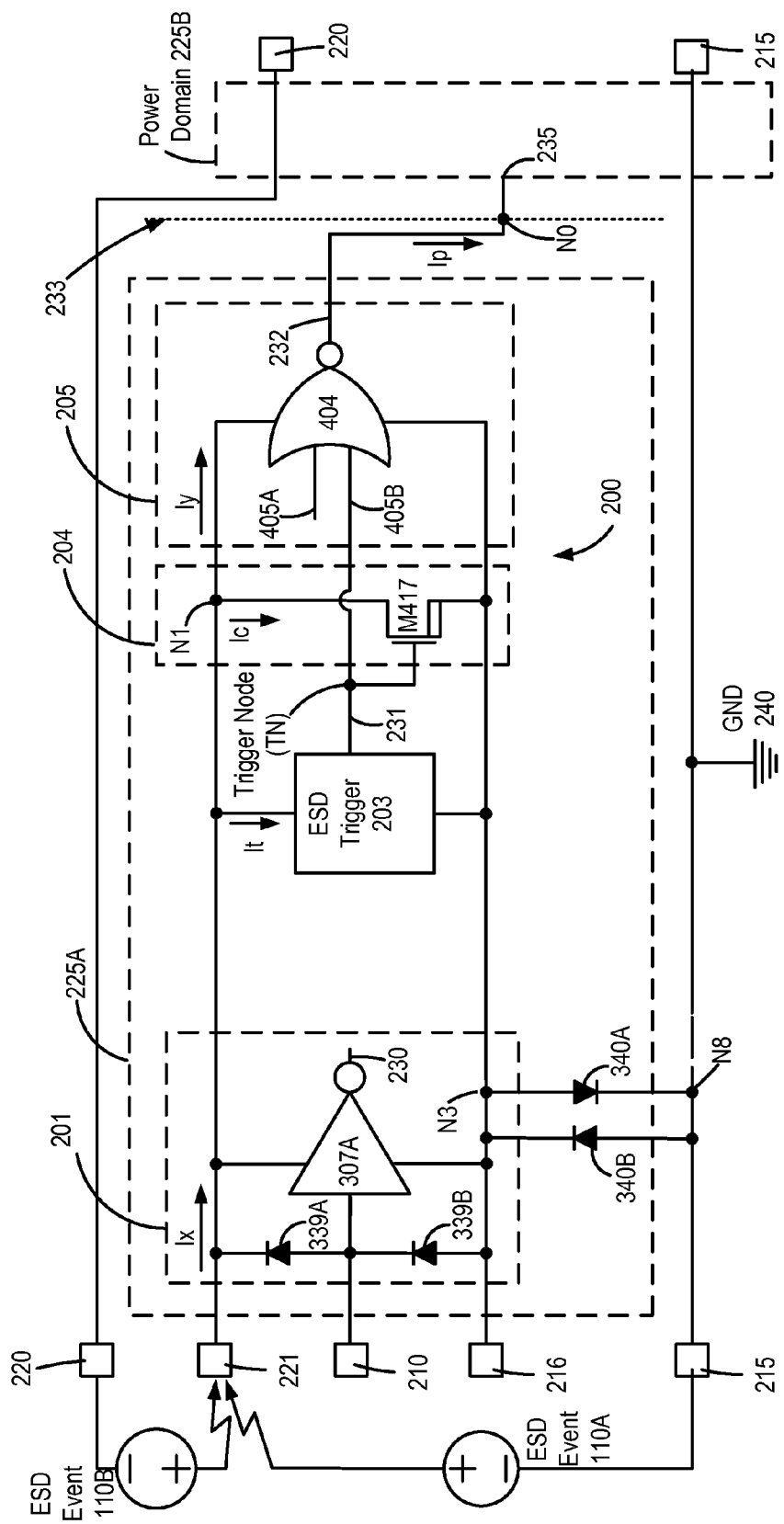
FIG. 4A is a circuit diagram illustrating an example configuration of standard cell components as an ESD device at a power domain boundary, according to one embodiment.

FIG. 4A is a circuit diagram illustrating an example configuration of standard cell components configured as an ESD device 200 at a power domain boundary 233, according to one embodiment. As shown in FIG. 4A, ESD device 200 components 203, 204, 205 may replace the local ESD structure 315 and the output block 302 illustrated in FIG. 3 for transmitting signals on the interface output 232. These elements of the ESD device 200 are commonly available in standard cell libraries.

The ESD trigger 203 detects ESD event 110 induced voltage changes on Vdd1 221 (e.g., in response to receiving current It which is a portion of the ESD current Ix) and generates a trigger signal corresponding to the event on the trigger signal line 231. The trigger signal line 231 is coupled to a trigger node (TN) and drives the trigger node to provide the trigger signal voltage for one or more components of the ESD device 200. Example embodiments of the ESD trigger 203 are explained in more detail with reference to FIG. 4B.

In one embodiment, the blocking device 205 is implemented with a NOR gate 404 that includes two signal input terminals 405A, 405B (2-NOR) and an output terminal forming the interface output 232. The NOR gate 404 additionally includes power and ground terminals respectively coupled to Vdd1 221 and Vss1 216. In other embodiments, the NOR gate 404 includes additional input terminals (e.g., 3 input terminals for a 3-NOR).

In the illustrated embodiment, the terminals 405A, 405B of the NOR 404 are configured such that the interface output 232 may transmit an inverted version of signals received at terminal 405A during normal operation. During ESD conditions, the NOR 404 operates to decouple Vdd1 221 from the interface output 232 to prevent transmission of ESD induced voltages to power domain 225B. The interface output 232 is coupled to node N0 at the power domain boundary 233.

Terminal 405A of the NOR 404 may be coupled to the signal line 230 of inverter 307A for receiving data signals. The received signals cause the NOR 404 to selectively couple the interface output 232 to Vdd1 221 or Vss1 216 to generate high and low output signals. Hence, like inverter 307B, the NOR 404 can drive node N0 high during an ESD event 110 and substantially expose the input terminal 235 to the ESD voltage at Vdd1 221. Too high of a voltage causes degrading of the input circuitry 307C, allowing the conduction of a gate breakdown current Ip as the result of electrons passing through the gate insulation of a transistor (e.g., due to too great a gate-source or gate-drain potential difference).

In one embodiment, the NOR 404 prevents or mitigates these effects through an operative coupling-decoupling of the interface output 232 and Vdd1 221 controlled via terminal 405B. Specifically, terminal 405B is coupled to the trigger node TN for receiving the trigger signal. The trigger signal on terminal 405B causes the NOR 404 to decouple the interface output 232 and Vdd1 221, thereby mitigating transmission of ESD induced voltages. In this way, the ESD device 205 prevents transmission of the ESD events 110 from power domain 225A to power domain 225B.

In some embodiments, the ESD device 200 includes an ESD clamp 204 to substantially conduct (current Ic which is a portion of) ESD current Ix to ground. The ESD clamp 204 includes a transistor M417 coupled to Vdd1 221 at node N1 and Vss1 216. In one embodiment, transistor M417 is an active high nMOS transistor M317 with a gate coupled to the trigger node, a drain terminal coupled to node N1 and a drain terminal coupled to Vss1 216. When the voltage at trigger node TN rises above the threshold voltage required for transistor M417 to conduct (e.g., transition from its OFF state to the ON state) due to the trigger signal, ESD clamp 204 conducts current Ic to Vss1 216. In this way, similar to the local ESD structure 315 described with reference to FIG. 3, the ESD clamp 204 protects components within the interface 101B itself from a voltage spike due to the ESD event 110.

Figure 4B:
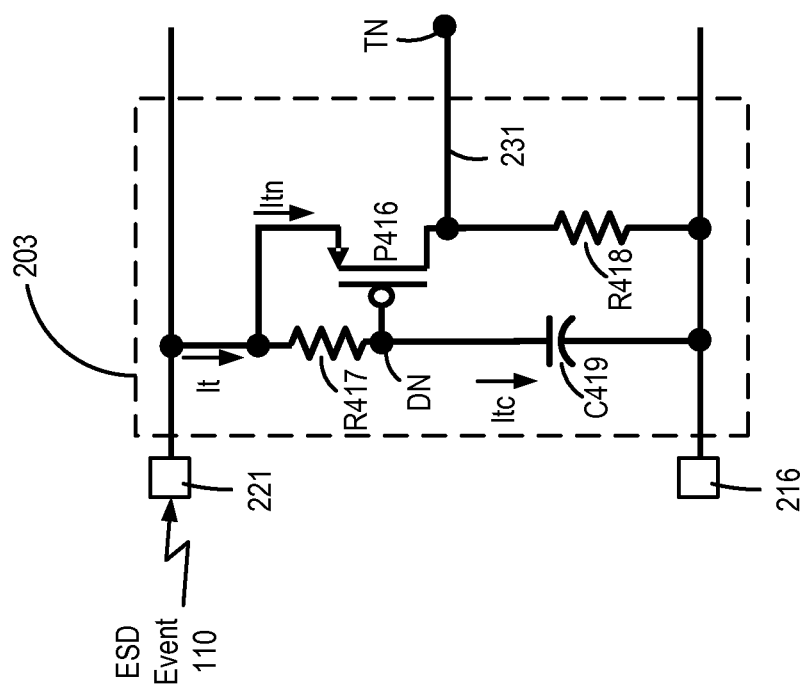
FIG. 4B is a circuit diagram illustrating an example configuration of an ESD trigger according to one embodiment.

FIG. 4B is a circuit diagram illustrating an example configuration of an ESD trigger 203 according to one embodiment. The ESD trigger 203 includes a resistor R417 that, in conjunction with capacitor C419, forms an RC voltage divider with an output at detection node DN. The gate of an active low pMOS transistor P416 is coupled to node DN and the source and drain are respectively coupled to Vdd1 221 and the ESD trigger line 231. A second resistor R418 is coupled between the ESD trigger line 231 and Vss1 216.

Current It in the ESD trigger 203 is the sum of current Itc through resistor 417 and current Itn through transistor P416. Current Itc results from the well known equation I(t)=C*dV(t)/dt where the current, I, at time t is equal to the capacitance C of C419 times the derivative of voltage V across the capacitor (i.e., potential difference from node DN and Vss1 216) with respect to time. Current Itc in resistor R417 causes a voltage potential across R417 measured from Vdd1 221 to node ND according to the well known equation V=I*R. With increase in current Itc, such as due to increase of voltage on Vdd1 due to an ESD event 110, the voltage potential across R417 increases.

The source and gate of transistor P416 are coupled to receive the potential generated by R417. When the potential (e.g., from Vdd1 221 to DN) reaches a threshold value, transistor P416 begins conducting current Itn. Current Itn in resistor R418 to Vss1 216 generates a corresponding voltage potential (e.g., a trigger signal) output on the trigger signal line 231.

As capacitor C419 is part of an RC voltage divider with resistor R417, their values may be selected according to a desired timing characteristic for driving node DN in response to changes in voltage on Vdd1 221. For example, the RC constant may be adjusted such that the ESD trigger 203 drives node TN high for the duration of an ESD event, e.g., 500 nanoseconds.

Additionally, the values of C419, R417 and R418 and properties of transistor P416 (e.g., threshold voltage, resistance, etc.) may be selected to provide a desired sensitivity to ESD events 110 before transistor P416 turns "ON" and drives node TN "high".

Figure 4C:
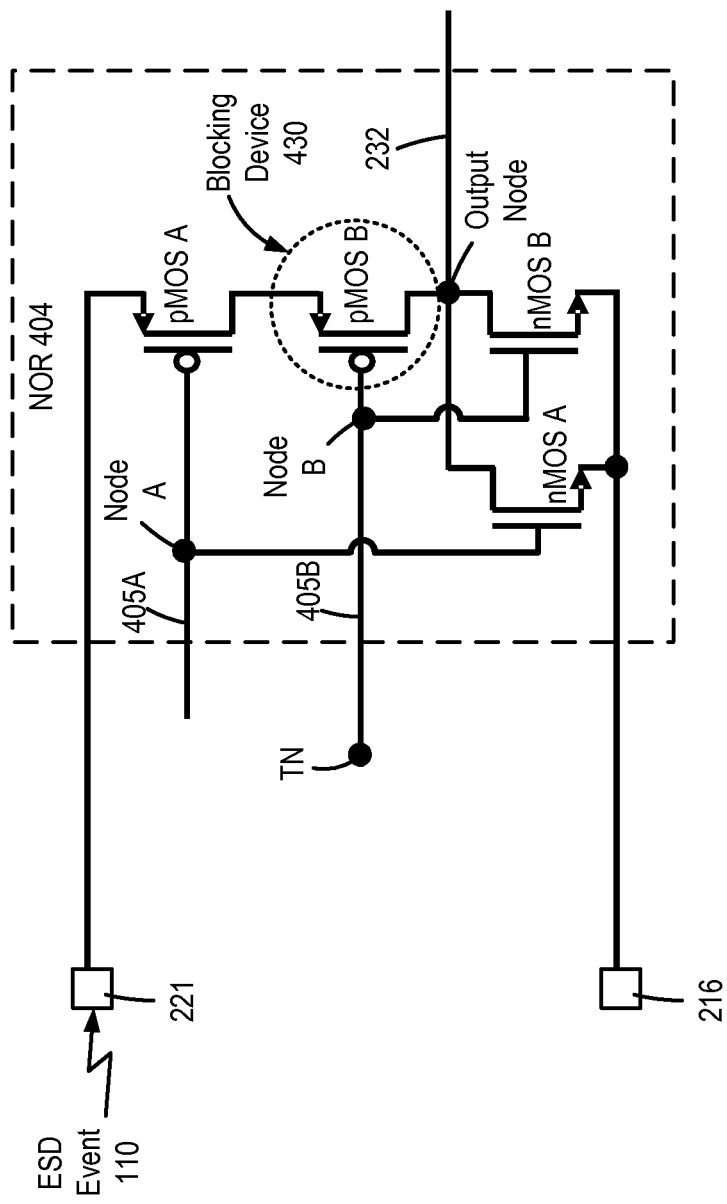
FIG. 4C is a circuit diagram illustrating an example configuration of a NOR gate with a blocking device in complementary metal-oxide-semiconductor (CMOS) architecture, according to one embodiment.

FIG. 4C is a circuit diagram illustrating an example configuration of a NOR 404 with a blocking device 430 in complementary metal-oxide-semiconductor (CMOS) architecture, according to one embodiment. As shown, the NOR 404 includes pMOS transistors (i.e., pMOS A and pMOS B) arranged in series with the source of pMOS A coupled to Vdd1 221, the source of pMOS B coupled to the drain of pMOS A and the drain of pMOS B coupled to the interface output at an output node. As shown in FIG. 4C, pMOS B is the last transistor (e.g., coupled to the output node) in a pMOS stack, in other embodiments, a pMOS higher in the stack (e.g., pMOS A) may be implemented as a blocking device.

The complimentary nMOS transistors (i.e., nMOS A and nMOS B) are accordingly arranged in parallel. Specifically, the drains and sources of nMOS A and nMOS B are respectively coupled to Vss1 216 and the output node. While the illustrated embodiment includes only two stacked pMOS transistors, additional pMOS transistors may be added to the top or bottom of the stack with additional (optional) nMOS transistors added in parallel with nMOS A and nMOS B.

The gate terminals of pMOS A and nMOS A are coupled at node A and collectively form input terminal 405A, which may be coupled to signal line 230. In a similar fashion, the gates of the other MOSs are coupled at node B and collectively form terminal 405B, which, as shown, is coupled to node TN.

According to the embodiment in FIG. 4C, during normal operation pMOS B is "ON" and corresponding nMOS B is "OFF" due to node TN held "low" by the ESD trigger 203. Complimentary pMOS A and nMOS A alternate between "OFF-ON" and "ON-OFF" states in response to signals received on the input terminal 405A. Thus, as shown in the abbreviated Negated-OR, $\overline{A+B}$, truth table (Table 1), for a signal (e.g., X) on terminal 405A, NOR 404 outputs an inverted version (e.g., $\overline{X}$) of the signal on the interface output 232.

TABLE 1

| 405A | 405B | Output 232 |
|------|------|------------|
| 0 | 0 | $\overline{X} = 1$ |
| 1 | 0 | $\overline{X} = 0$ |

As explained previously, during an ESD event 110, the ESD trigger 203 drives node TN "high" and thus turns active low pMOS B "OFF". With pMOS B "OFF", pMOS B functions as a blocking device 430 that substantially prevents flow of current from Vdd1 221 to the interface output 232. As shown in the abbreviated truth table (Table 2), for a signal (e.g., X) on terminal 405A, NOR 404 does not output "high" signals on the interface output 232 when node TN is "high" and pMOS B blocks the flow of current. Additionally, as nMOS B is conducting and couples the interface output 232 to Vss1 216, any leakage current through pMOS B may be conducted to ground.

TABLE 2

| 405A | 405B | Output 232 |
|------|------|------------|
| 0    | 1    | $\overline{X} = 0$ |
| 1    | 1    | $\overline{X} = 0$ |

As the NOR 404 (and other components) does not include resistor-capacitor (RC) based circuit(s) coupled to the interface output signal 232, signal timing delays and large footprints associated with RC circuits are minimized. Additionally, while the pMOS B and/or pMOS A still experience ESD induced voltages at their sources, pMOS's are, in general, less susceptible to oxide damage than their nMOS counterparts.

Figure 5:
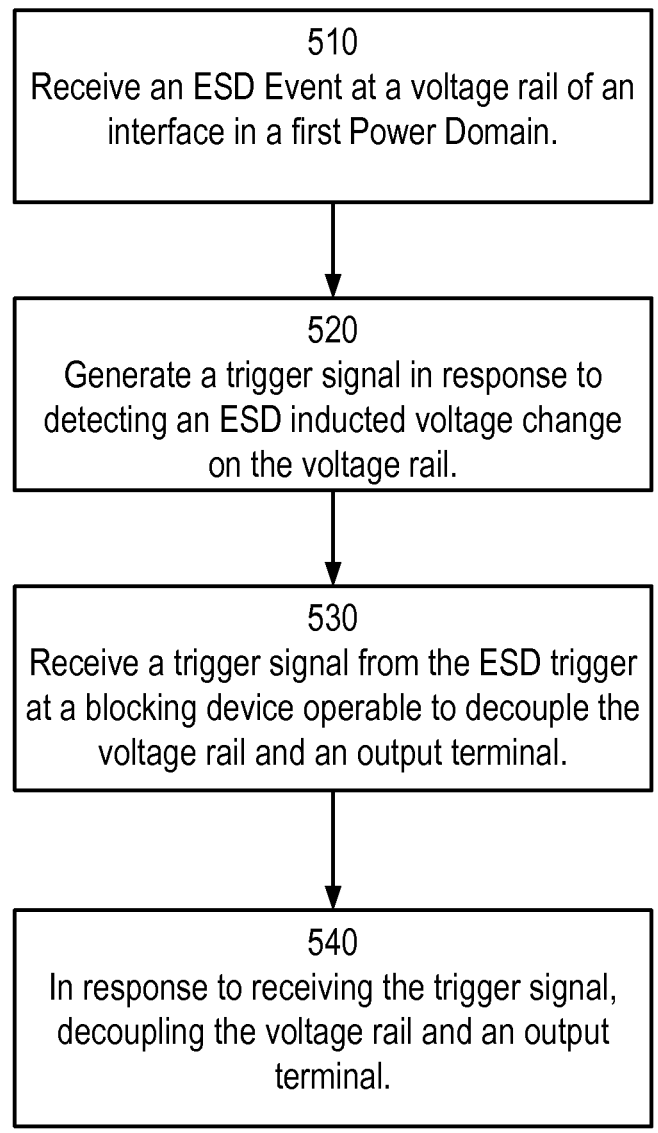
FIG. 5 is a flowchart illustrating a method of preventing device failure on a system-on-chip from an ESD event using a blocking device, according to one embodiment.

FIG. 5 is a flowchart illustrating a method of preventing device failure on a SoC 100 from an ESD event using a blocking device 205, according to one embodiment. First, an interface 101B within a first power domain (e.g., power domain 225A) of the SoC 100 receives 510 an ESD Event 110 at a voltage rail (e.g., Vdd1 221) of the interface 101B. The ESD event 110 induces a voltage change along Vdd1 221 and may damage SoC 100 components within a second domain (e.g., power domain 225B) if Vdd1 221 is coupled to the interface output 232 during the event.

An ESD trigger 203 is coupled to the voltage rail and receives the voltage change caused by the ESD event on the voltage rail. The ESD trigger 203 detects the ESD event based on the voltage change and generates 520 a trigger signal corresponding to detection of the ESD event. The ESD trigger 203 outputs the trigger signal to drive a trigger node coupled to components of the ESD circuit 200.

A blocking device 205 is coupled to the trigger node and receives 530 the trigger signal from the ESD trigger. The blocking device 205 may be coupled between the voltage rail Vdd1 221 and the output terminal 232 of the interface 101B and operable to couple and decouple the voltage rail and output terminal of the interface 101B.

In response to receiving the trigger signal, the blocking device 205 decouples the first voltage rail from the output terminal to prevent failure or damage of components in the second power domain due to the ESD event. In one embodiment, the decoupling of the voltage rail from the output terminal substantially prevents the conduction of current from the voltage rail to the output terminal 232 of the first power domain during the ESD event. In turn, the output terminal 232 of the first voltage domain does not transmit the ESD event (e.g., mitigates application of ESD induced current or voltage) to components within the second power domain 225B.

Embodiments also relate to a layout representing an IC implementing the ESD device described herein. Such layout may be in the form of an electronic data that may be stored in a computer-readable storage medium such as ROM or RAM. The layout may be saved, read or processed by a computing system (including memory and a processor) as part of Electronic Design Automation (EDA) processes. The layout may be in various formats including but not limited to EDIF, CIF, Applicon, DXF, GDS II, and OASIS. In one embodiment, the layout may be assembled in an EDA process that involves standard cell libraries.

Embodiments of the cross domain ESD device detailed herein enable the mitigation of ESD event transmission across power domain boundaries. Components including embodiments of the cross domain ESD device, such as an interface that receives ESD events, may mitigate the transmission of ESD induced voltages and current to other components in other power domains. Accordingly, incorporation of the cross domain ESD device in components at power domain boundaries provides cross domain ESD protection to other components that may not include cross domain ESD event protection.

Upon reading this disclosure, those of ordinary skill in the art will appreciate still additional alternative structural and functional designs through the disclosed principles of the embodiments. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. An electrostatic discharge (ESD) device, comprising:
a first standard cell component coupled to a first voltage rail of a first power domain and coupled to a component within a second power domain, the first standard cell component comprising:
an output terminal coupled to the component within the second power domain,
a blocking device configured to operatively decouple the first voltage rail from the output terminal according to a trigger signal, and
a first transistor coupled to the first voltage rail and configured to turn on or off first current to the blocking device according to a data signal;
a second standard cell component coupled to the first voltage rail of the first power domain and configured to change the trigger signal in response to a change in voltage at the first voltage rail, the second standard cell comprising a second transistor, the second transistor comprising:
a source terminal coupled to the first voltage rail,
a drain terminal configured to output the trigger signal, and
a gate terminal, the trigger signal changed in response to a voltage level at the gate terminal reaching a threshold value relative to at least one of the source terminal and the drain terminal; and
an ESD clamp configured to conduct second current from the first voltage rail to the output terminal according to the trigger signal.

2. The ESD device of claim 1, wherein the blocking device and the first transistor are serially coupled.

3. The ESD device of claim 1, wherein the blocking device is coupled to the output terminal and operatively coupled to the first voltage rail by the first transistor according to the data signal.

4. The ESD device of claim 1, wherein the second standard cell further comprises a resistive element coupled to the first voltage rail and the gate terminal to set the voltage level at the gate terminal lower than the source terminal.

5. The ESD device of claim 1, wherein the first standard cell component and the second standard cell component are instantiated during a design stage by retrieving information from a standard cell library.

6. The ESD device of claim 1, wherein the first transistor of the first standard cell component is a first p-type metal-oxidesemiconductor field-effect transistor (pMOS) and the blocking device of the first standard cell component is a second pMOS transistor,
the first pMOS transistor comprising a source terminal coupled to the first voltage rail, a gate terminal coupled to a data signal line, and a drain terminal coupled to a source terminal of the second pMOS transistor, and
the second pMOS transistor comprising a source terminal coupled to the first pMOS transistor, a gate terminal coupled to a trigger node, and a drain terminal coupled to the output terminal.

7. An electronic device including an electrostatic discharge (ESD) device, the electronic device comprising:
a first standard cell component coupled to a first voltage rail of a first power domain and coupled to a component within a second power domain, the first standard cell component comprising:
an output terminal coupled to the component within the second power domain,
a blocking device configured to operatively decouple the first voltage rail from the output terminal according to a trigger signal, and
a first transistor coupled to the first voltage rail and configured to turn on or off first current to the blocking device according to a data signal;
a second standard cell component coupled to the first voltage rail of the first power domain and configured to change the trigger signal in response to a change in voltage at the first voltage rail, the second standard cell comprising a second transistor comprising:
a source terminal coupled to the first voltage rail,
a drain terminal configured to output the trigger signal, and
a gate terminal, the trigger signal changed in response to a voltage level at the gate terminal reaching a threshold value relative to at least one of the source terminal and the drain terminal; and
an ESD clamp configured to conduct second current from the first voltage rail to the output terminal according to the trigger signal.

8. A non-transitory computer readable storage medium storing data representing an electrostatic discharge (ESD) device, the ESD device comprising:
a first standard cell component coupled to a first voltage rail of a first power domain and coupled to a component within a second power domain, the first standard cell component comprising:
an output terminal coupled to the component within the second power domain,
a blocking device configured to operatively decouple the first voltage rail from the output terminal according to a trigger signal, and
a first transistor coupled to the first voltage rail and configured to turn on or off first current to the blocking device according to a data signal;
a second standard cell component coupled to the first voltage rail of the first power domain and configured to change the trigger signal in response to a change in voltage at the first voltage rail, the second standard cell component comprising a second transistor comprising:
a source terminal coupled to the first voltage rail,
a drain terminal configured to output the trigger signal, and
a gate terminal, the trigger signal changed in response to a voltage level at the gate terminal reaching a threshold value relative to at least one of the source terminal and the drain terminal; and
an ESD clamp configured to conduct second current from the first voltage rail to the output terminal according to the trigger signal.

9. The storage medium of claim 8, wherein the blocking device and the first transistor are serially coupled.

10. The storage medium of claim 8, wherein the blocking device is coupled to the output terminal and operatively coupled to the first voltage rail by the first transistor according to the data signal.

11. The storage medium of claim 8, wherein the first transistor of the first standard cell component is a first p-type metal-oxide-semiconductor field-effect transistor (pMOS) and the blocking device of the first standard cell component is a second pMOS transistor,
the first pMOS transistor comprising a source terminal coupled to the first voltage rail, a gate terminal coupled to a data signal line, and a drain terminal coupled to a source terminal of the second pMOS transistor, and
the second pMOS transistor comprising a source terminal coupled to the first pMOS transistor, a gate terminal coupled to a trigger node, and a drain terminal coupled to the output terminal.

* * * * *